United States Patent
Chen et al.

(10) Patent No.: US 9,960,655 B2
(45) Date of Patent: May 1, 2018

(54) MOTOR AND WINDING ASSEMBLY THEREOF

(71) Applicant: Sunonwealth Electric Machine Industry Co., Ltd., Kaohsiung (TW)

(72) Inventors: Guan-Ming Chen, Kaohsiung (TW); Chang-Yu Lin, Kaohsiung (TW); Li-Yang Lyu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 328 days.

(21) Appl. No.: 14/861,836

(22) Filed: Sep. 22, 2015

(65) Prior Publication Data

US 2016/0126795 A1    May 5, 2016

(30) Foreign Application Priority Data

Oct. 31, 2014    (TW) .............................. 103137879 A

(51) Int. Cl.
*H02K 3/26* (2006.01)
*H02K 5/22* (2006.01)
*H02K 11/00* (2016.01)
*H02K 11/30* (2016.01)

(52) U.S. Cl.
CPC .............. *H02K 5/225* (2013.01); *H02K 3/26* (2013.01); *H02K 11/0073* (2013.01); *H02K 11/30* (2016.01); *H02K 2211/03* (2013.01)

(58) Field of Classification Search
CPC .. H02K 2203/03; H02K 3/26; H02K 2211/03; H02K 15/0407

USPC ..................................................... 310/DIG. 6
See application file for complete search history.

(56) References Cited

U.S. PATENT DOCUMENTS

| 3,091,711 A | * | 5/1963 | Henry-Baudot | H02K 3/26 310/268 |
| 4,661,733 A | * | 4/1987 | Heyraud | H02K 5/143 310/268 |
| 4,668,884 A | * | 5/1987 | Amao | H02K 29/08 310/156.05 |

(Continued)

FOREIGN PATENT DOCUMENTS

| CN | 1675815 A | 9/2005 |
| JP | 2009130971 A | 6/2009 |

(Continued)

*Primary Examiner* — Jeremy Luks
(74) *Attorney, Agent, or Firm* — Alan D. Kamrath; Kamrath IP Lawfirm, P.A.

(57) ABSTRACT

A motor includes a base, a winding assembly and a rotor. The base includes a pivoting portion. The winding assembly includes a support. The support includes at least one coil supporting portion and a circuit supporting portion connected to the at least one coil supporting portion. A coil is arranged on each of the at least one coil supporting portion. A circuit is arranged on the circuit supporting portion and electrically connected to the coil or coils. A folding portion is arranged between the at least one coil supporting portion and the circuit supporting portion. The circuit supporting portion and the at least one coil supporting portion are folded and stacked together via the folding portion. The rotor is rotatably coupled to the pivoting portion of the base. Due to the arrangement of the folding portion, a radial width of the motor is efficiently reduced.

12 Claims, 6 Drawing Sheets

(56) References Cited

U.S. PATENT DOCUMENTS

| | | | |
|---|---|---|---|
| 5,644,183 A * | 7/1997 | Van Loenen | H02K 3/26 310/268 |
| 6,522,037 B2 * | 2/2003 | Lee | H02K 5/225 310/68 R |
| 6,608,411 B2 * | 8/2003 | Horng | H02K 3/26 310/207 |
| 7,291,956 B2 | 11/2007 | Itoh et al. | |
| 7,800,274 B2 * | 9/2010 | Yamaguchi | H02K 1/182 310/254.1 |
| 2003/0117029 A1 * | 6/2003 | Horng | H02K 3/47 310/89 |
| 2008/0021281 A1 * | 1/2008 | Fujimori | A61B 1/00016 600/160 |
| 2008/0088191 A1 * | 4/2008 | Park | H02K 5/145 310/71 |
| 2014/0203680 A1 | 7/2014 | Yin et al. | |

FOREIGN PATENT DOCUMENTS

| | | |
|---|---|---|
| TW | 201103234 A | 1/2011 |
| TW | I384723 B | 2/2013 |
| TW | 201431254 A | 8/2014 |
| TW | I459687 B | 11/2014 |

* cited by examiner

MOTOR AND WINDING ASSEMBLY THEREOF

CROSS REFERENCE TO RELATED APPLICATIONS

The application claims the benefit of Taiwan application serial No. 103137879, filed on Oct. 31, 2014, the subject matter of which is incorporated herein by reference.

BACKGROUND OF THE INVENTION

1. Field of the Invention

The present invention generally relates to a motor and a winding assembly thereof and, more particularly, to a motor having a foldable winding assembly.

2. Description of the Related Art

Please refer to FIG. 1, a conventional motor 8 includes a rotor 81 and a foldable stator 82. A permanent magnet 811 of the rotor 81 is magnetically linked with the foldable stator 82, driving the rotor 81 to rotate. The foldable stator 82 includes a plurality of supports 821 stacked together to form a foldable support structure. A coil 822 is arranged on each of the supports 821. In addition, a driving circuit 823 is electrically connected to a side of the foldable stator 82. Detailed structure and operational principle of the conventional motor 8 can be seen in Taiwan Patent Publication No. 201328128.

Since the driving circuit 823 of the conventional motor 8 is electrically connected to the side of the foldable stator 82, when the conventional motor 8 is assembled to a base 83 or a fan frame, the driving circuit 823 may occupy an extra space along a radial direction perpendicular to an axial direction of the rotor 81. Therefore, a radial width of the motor is increased, thus adversely affecting the miniaturization of the conventional motor 8.

Furthermore, FIG. 2 shows another conventional motor 9 including a base 91, a stator 92, a rotor 93 and an auxiliary element 94. The stator 92 is coupled to the base 91, and the rotor 93 is rotatably coupled to the base 91. The auxiliary element 94 is arranged between the base 91 and the rotor 93. In this arrangement, the stator 92 can also be magnetically linked with the rotor 93, driving the rotor 93 to rotate. Detailed structure and operational principle of the conventional motor 9 can be seen in Taiwan Patent No. 1,384,723.

Since the auxiliary element 94 is arranged between the base 91 and the rotor 93, the auxiliary element 94 does not occupy an extra space along a radial direction perpendicular to an axial direction of the rotor 93, thus reducing a radial width of the motor 9. However, since the auxiliary element 94 is not integrated with the stator 92, when the motor 9 is assembled, it is necessary to position the auxiliary element 94 before mounting the stator 92. Thus, the assembly of the motor 9 is complicated and inconvenient.

SUMMARY OF THE INVENTION

It is therefore the objective of this invention to provide a motor whose radial width is effectively reduced.

It is another objective of this invention to provide a motor with an improved and convenient assembly procedure.

The present invention provides a motor including a base, a winding assembly and a rotor. The base includes a pivoting portion. The winding assembly includes a support. The support includes at least one coil supporting portion and a circuit supporting portion connected to the at least one coil supporting portion. A coil is arranged on each of the at least one coil supporting portion. A circuit is arranged on the circuit supporting portion and electrically connected to the coil or coils. A folding portion is arranged between the at least one coil supporting portion and the circuit supporting portion. The circuit supporting portion and the at least one coil supporting portion are folded and stacked together via the folding portion. The rotor is rotatably coupled to the pivoting portion of the base.

In a form shown, the circuit supporting portion is arranged between the at least one coil supporting portion and the base.

In the form shown, a receiving portion is arranged on the base. The circuit supporting portion is received in the receiving portion.

In the form shown, the circuit supporting portion has a surface area smaller than a surface area of each of the at least one coil supporting portion.

In the form shown, a central hole is arranged at each of the at least one coil supporting portion. The pivoting portion extends through the central hole.

In the form shown, the circuit is a driving circuit, a control circuit, a detecting circuit, or a combination thereof.

In the form shown, the at least one coil supporting portion includes a plurality of foldable coil supporting portions. The circuit supporting portion is connected to one of the plurality of coil supporting portions. The plurality of coil supporting portions and the circuit supporting portions are folded and stacked together to form a multi-layered winding structure.

In the form shown, an electrical port is arranged on the folding portion of the support and electrically connected to the circuit.

In the form shown, the circuit supporting portion further comprises an auxiliary folding portion.

Due to the arrangement of the folding portion of the winding assembly, the circuit supporting portion can be folded and stacked with the coil supporting portion(s). Thus, the radial width of the motor is efficiently reduced, and the assembly of the motor is simplified. Therefore, miniaturization of the motor of the present invention and convenient assembly of said motor can be provided.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
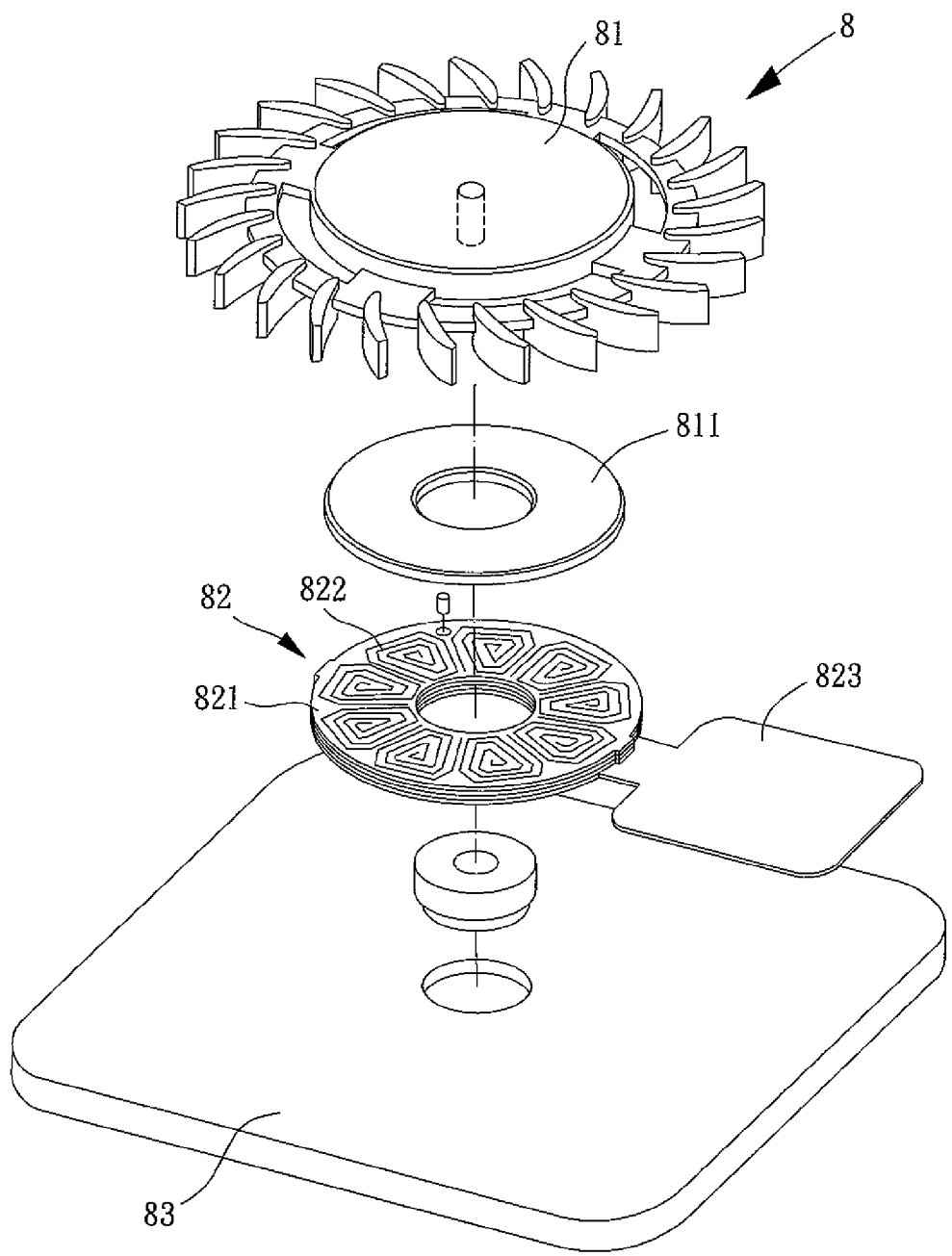
FIG. 1 is an exploded view of a conventional motor.
Figure 2:
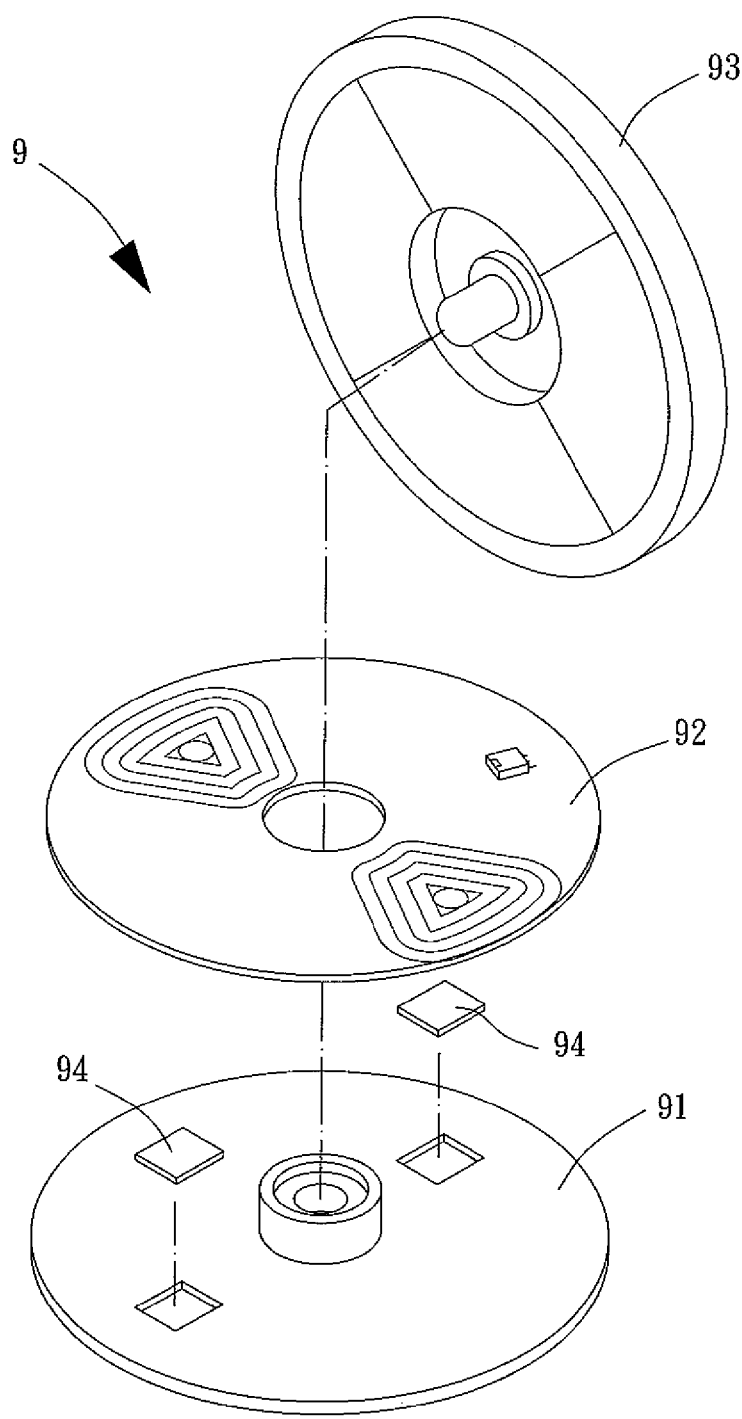
FIG. 2 is an exploded view of another conventional motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
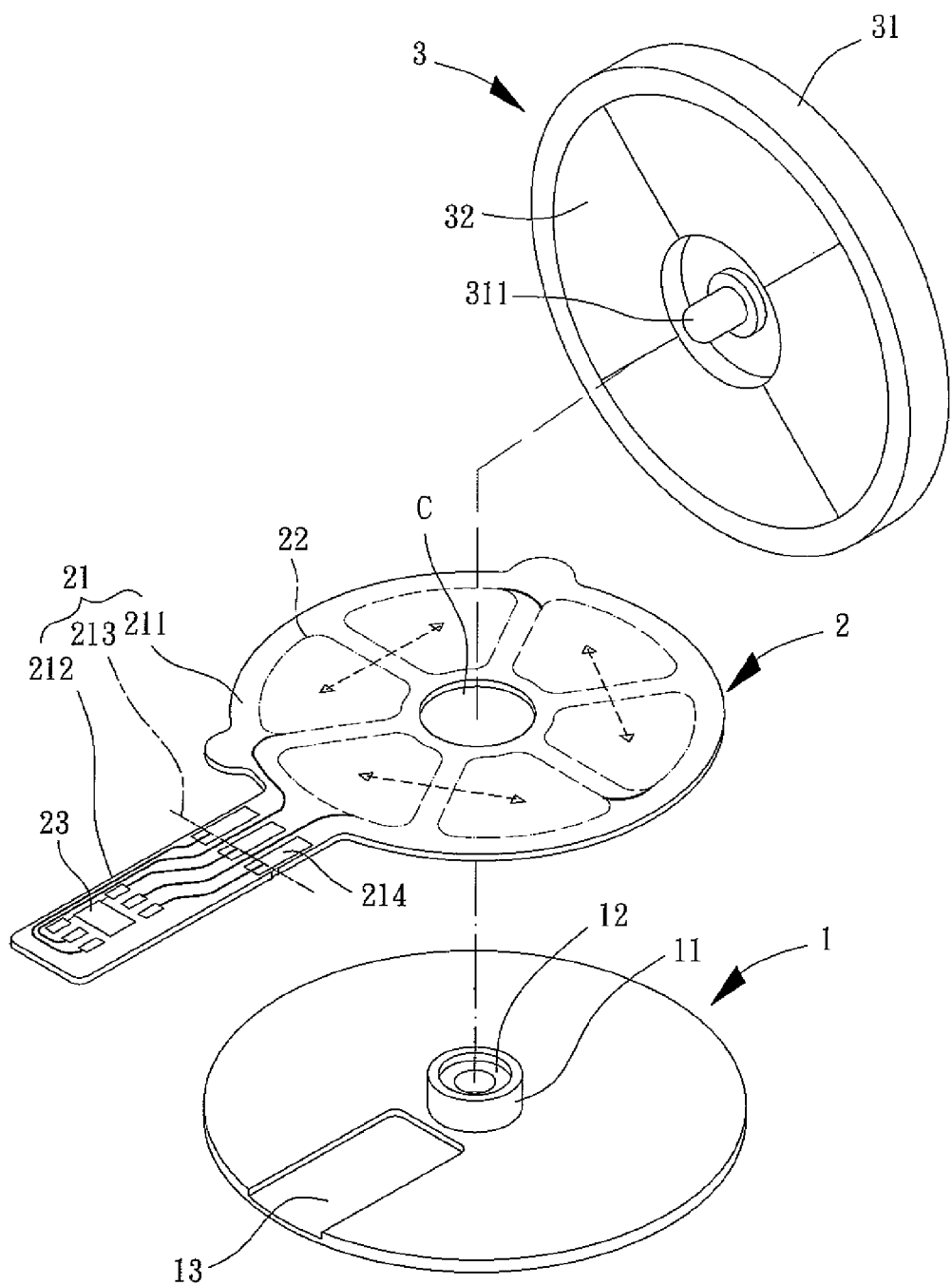
FIG. 3 is an exploded view of a motor according to a first embodiment of the present invention.

Please refer to FIG. 3, a motor according to a first embodiment of the present invention includes a base 1, a winding assembly 2 and a rotor 3. The base 1 may be coupled with the winding assembly 2, and the rotor 3 is rotatably coupled to the base 1. The winding assembly 2 is used to drive the rotor 3 to rotate.

A pivoting portion 11 is arranged on one surface of the base 1 and can be in the form of a shaft tube, a shaft seat or other structure with which the rotor 3 can be rotatably coupled. In this embodiment, the pivoting portion 11 is a shaft tube, and a bearing 12 may be received in the shaft tube.

The winding assembly 2 includes a support 21. The support 21 can be a flexible printed circuit board, a flexible substrate or other foldable plate, which is not limited in the present invention. The support 21 includes at least one coil supporting portion 211 and a circuit supporting portion 212 connected to the at least one coil supporting portion 211. A central hole "C" may be arranged at each coil supporting portion 211, such that the pivoting portion 11 of the base 1 can extend through said coil supporting portion 211 when the support 21 is arranged on the base 1. Moreover, the at least one coil supporting portion 211 may include a single coil supporting portion 211 or a plurality of coil supporting portions 211, which is not limited in the present invention. In this embodiment, the at least one coil supporting portion 211 includes a single coil supporting portion 211, and one or a plurality of coils 22 can be formed on a surface of the coil supporting portion 211 by printing or an electrical forming process. A circuit 23 is arranged on a surface of the circuit supporting portion 212 and may be a driving circuit, a control circuit, a detecting circuit, or a combination thereof. The circuit 23 is electrically connected to the coil(s) 22.

Figure 4:
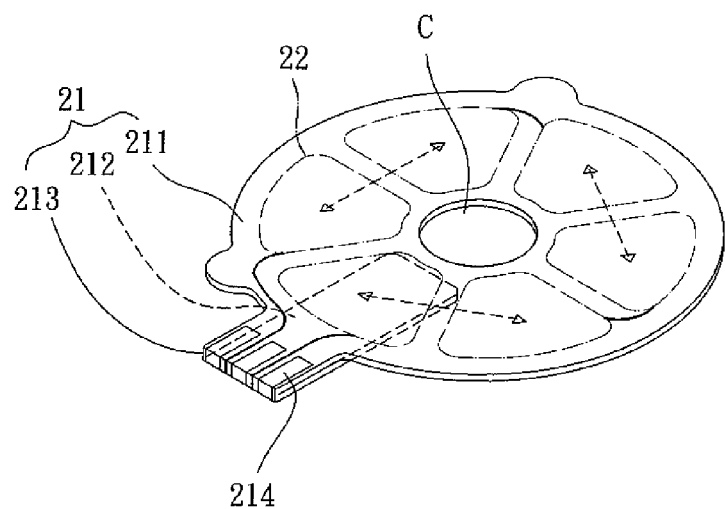
FIG. 4 is a perspective view of a folded winding assembly of the motor according to the first embodiment of the present invention.
Figure 5:
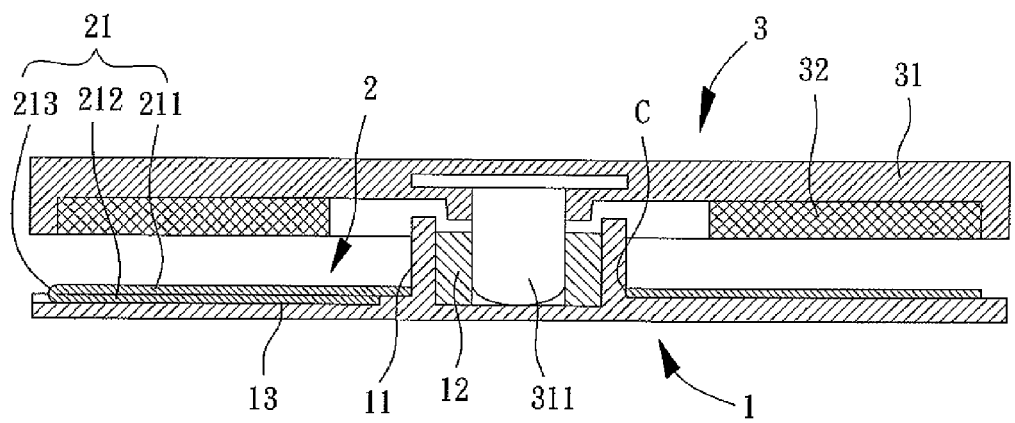
FIG. 5 is a cross sectional view of the motor according to the first embodiment of the present invention.

The support 21 includes a folding portion 213 arranged between the coil supporting portion 211 and the circuit supporting portion 212. As shown in FIGS. 4 and 5, due to the arrangement of the folding portion 213, the circuit supporting portion 212 can be folded and stacked with the coil supporting portion 211. Preferably, the circuit supporting portion 212 is arranged between the coil supporting portion 211 and the base 1. As such, the circuit supporting portion 212 and the circuit 23 are not arranged in a location outside of the coverage of the coil supporting portion 211. This prevents the circuit supporting portion 212 from occupying any radial space outwards of the outer periphery of the coil supporting portion 211 and therefore advantageously reduces the radial width of the winding assembly 2.

An electrical port 214 (such as golden-finger contacts) may be arranged on the folding portion 213 of the support 21 and electrically connected to the circuit 23. When the circuit supporting portion 212 is folded and stacked with the coil supporting portion 211, the electrical port 214 is accessible so that it can be connected by a power source or other electronic components, thus allowing the power or control signal to be supplied or transmitted to the winding assembly 2 therethrough.

The shape of the circuit support portion 212 may be rectangular, circular, oval or semicircular, which is not limited in the present invention. In this embodiment, the shape of the circuit supporting portion 212 is rectangular. Since the arrangement of the coil 22 requires a space larger than the required space of the circuit 23, the circuit supporting portion 212 may have a surface area smaller than that of the coil supporting portion 211. Thus, the size of the circuit supporting portion 212 is efficiently reduced. As such, the production cost of the winding assembly 2 is reduced, and the circuit supporting portion 212 will not occupy any extra radial space outwards of the periphery of the coil supporting portion 211. Therefore, the size of the winding assembly 2 is reduced for miniaturization of the winding assembly 2. Furthermore, a receiving portion 13 may be arranged on the base 1, such as a recess or a through hole for receiving the circuit supporting portion 212, in order to efficiently reduce the axial height of the motor after assembly.

The rotor 3 includes a hub 31 and a permanent magnet 32. The hub 31 includes a shaft 311 rotatably coupled to the pivoting portion 11 of the base 1. The permanent magnet 32 is coupled to the hub 31, and a gap is formed between the permanent magnet 32 and the winding assembly 2. In this arrangement, the winding assembly 2 is magnetically linked with the permanent magnet 32, driving the rotor 3 to rotate.

Due to the arrangement of the folding portion 213 of the winding assembly 2, the circuit supporting portion 212 can be folded and stacked with the coil supporting portion 211, thus efficiently reducing the radial width of the motor and achieving miniaturization of the motor. Furthermore, since the coil supporting portion 211 and the circuit supporting portion 212 are integrated together in a foldable manner, the assembly of the winding assembly 2 simply requires the circuit supporting portion 212 to be folded to the coil supporting portion 211. Thus, assembly of the motor is simplified and convenient.

Figure 6:
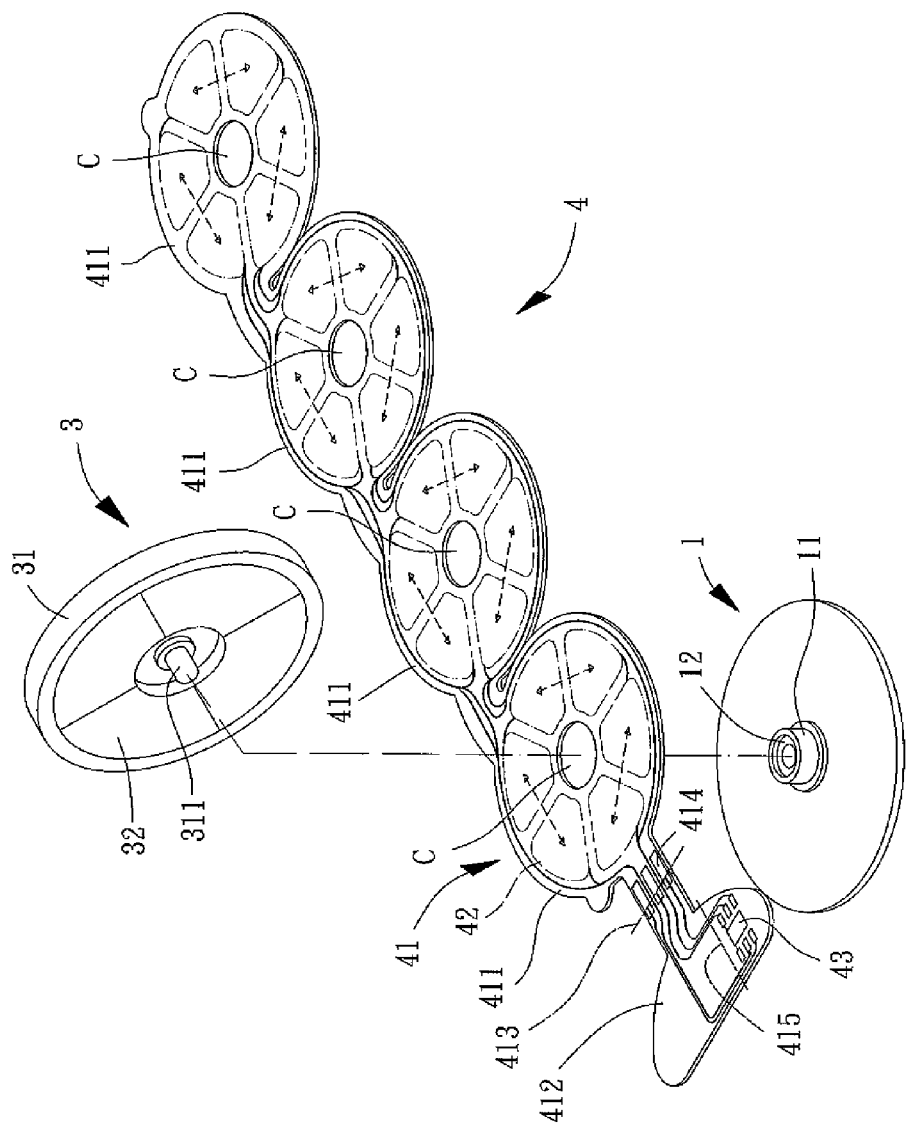
FIG. 6 is an exploded view of a motor according to a second embodiment of the present invention.

Please refer to FIG. 6, a motor according to a second embodiment of the present invention also includes a base 1, a winding assembly 4 and a rotor 3. The motor of the present embodiment differs from that of the first embodiment in the winding assembly 4. The winding assembly 4 includes a support 41. The support 41 includes a plurality coil supporting portions 411 and a circuit supporting portion 412. The coil supporting portions 411 can be folded one upon another. The circuit supporting portion 412 is connected to one of the coil supporting portions 411. A central hole "C" is arranged at each of the coil supporting portions 411, and a coil 42 is arranged on a surface of each of the supporting portions 411. A circuit 43 is arranged on a surface of the circuit supporting portion 412 and is electrically connected to the coils 42.

Figure 7:
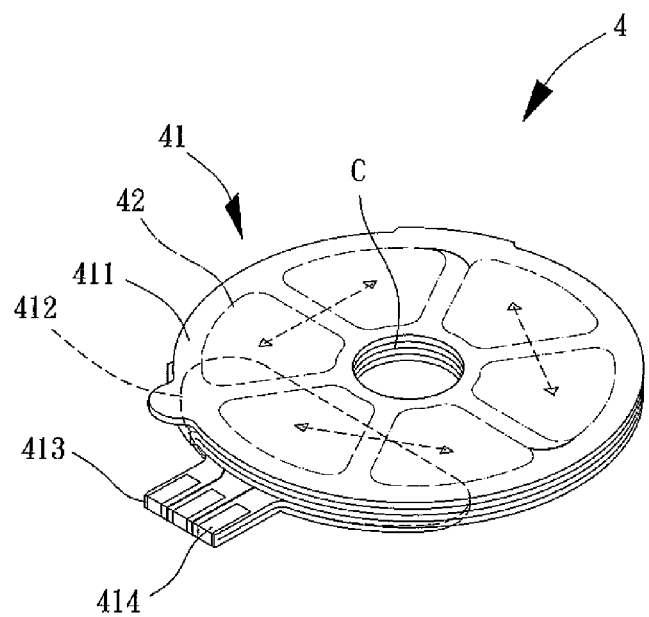
FIG. 7 is a perspective view of a folded winding assembly of the motor according to the second embodiment of the present invention.
Figure 8:
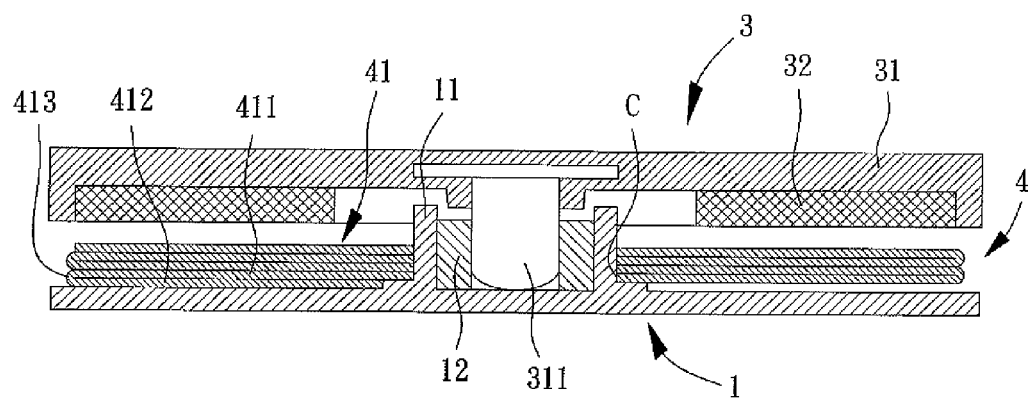
FIG. 8 is a cross sectional view of the motor according to the second embodiment of the present invention.

The support 41 includes a folding portion 413 arranged between the circuit supporting portion 412 and the leftmost coil supporting portion 411 to which the circuit supporting portion 412 is connected. An electrical port 414 may also be arranged on the folding portion 413. As shown in FIGS. 7 and 8, the plurality of coil supporting portions 411 and the circuit supporting portion 412 can be folded and stacked together to form a multi-layered winding structure, which also reduces the radial width of the winding assembly 4. Moreover, the shape of the circuit supporting portion 412 in the present embodiment is semicircular. With comparison to the circuit supporting portion 212 of the first embodiment, the semicircle-shaped circuit supporting portion 412 provides a larger surface area for arrangement of the circuit 43. In this regard, an auxiliary folding portion 415 may be arranged on the circuit supporting portion 412 (the same may be provided on the circuit supporting portion 212 in the first embodiment). When the circuit 43 includes a detecting circuit, the circuit supporting portion 412 can be further folded using the auxiliary folding portion 415 to fine adjust the position of the detecting circuit (i.e. adjusting the detecting circuit in a location more adjacent to the central hole "C" or more adjacent to the periphery of the coil supporting portions 411). Thus, the position of the detecting circuit relative to the permanent magnet 32 is adjusted, and the operational efficiency of the motor is improved. Especially, when the position of the detecting circuit is adjacent to the periphery of the circuit supporting portion (such as located adjacent to the part of the periphery of the circuit supporting portion 212 that is most distant to the central hole "C" as shown in FIG. 3, or located adjacent to the part of the periphery of the circuit supporting portion 412 that is more adjacent to the auxiliary folding portion 415 as shown in FIG. 6), the position of the detecting circuit can be easily adjusted using the auxiliary folding portion 415, thus providing a convenient assembly and adjustment. In addition, the semicircle-shaped circuit supporting portion 412 may be connected to the right side, the left side, the top side or the bottom side of the leftmost coil supporting portion 411, which is not limited in the present invention. As shown in FIG. 6, the circuit supporting portion 412 will be located on the left part of the leftmost coil supporting portions 411 after the folding process. Furthermore, the circuit supporting portion 412 may have a surface area smaller than that of each coil supporting portion 411 in order to further reduce the size of the circuit supporting portion 412.

As a conclusion, due to the arrangement of the folding portion 213. 413 of the winding assembly 2, 4, the circuit supporting portion 212, 412 can be folded and stacked with the coil supporting portion(s) 211, 411. Thus, the radial width of the motor is efficiently reduced, and the assembly of the motor is simplified. Therefore, miniaturization of the motor of the present invention and convenient assembly of said motor can be provided.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising: a base comprising a pivoting portion; a winding assembly comprising a support, wherein the support comprises at least one coil supporting portion and a circuit supporting portion connected to the at least one coil supporting portion, wherein a coil is arranged on each of the at least one coil supporting portion, wherein a circuit is arranged on the circuit supporting portion and electrically connected to the coil or coils, wherein a folding portion is arranged between the at least one coil supporting portion and the circuit supporting portion, wherein the circuit supporting portion and the at least one coil supporting portion are folded and stacked together via the folding portion, and wherein the circuit supporting portion has a distal end located between a center and an outer periphery of the at least one coil supporting portion in a radial direction; and a rotor rotatable coupled to the pivoting portion of the base, wherein the at least one coil supporting portion abuts a surface of the base, and wherein the circuit supporting portion is sandwiched between the at least one coil supporting portion and the surface of the base.

2. The motor as claimed in claim 1, wherein the circuit supporting portion is arranged between the at least one coil supporting portion and the base.

3. The motor as claimed in claim 1, wherein a receiving portion is arranged on the base, and wherein the circuit supporting portion is received in the receiving portion.

4. The motor as claimed in claim 1, wherein the circuit supporting portion has a surface area smaller than a surface area of each of the at least one coil supporting portion.

5. The motor as claimed in claim 1, wherein a central hole is arranged at each of the at least one coil supporting portion, and wherein the pivoting portion extends through the central hole.

6. The motor as claimed in claim 1, wherein the circuit is a driving circuit, a control circuit, a detecting circuit, or a combination thereof.

7. The motor as claimed in claim 1, wherein the at least one coil supporting portion comprises a plurality of foldable coil supporting portions, wherein the circuit supporting portion is connected to one of the plurality of foldable coil supporting portions, and wherein the plurality of foldable coil supporting portions and the circuit supporting portion are folded and stacked together to form a multi-layered winding structure.

8. The motor as claimed in claim 1, wherein an electrical port is arranged on the folding portion of the support and electrically connected to the circuit.

9. The motor as claimed in claim 1, wherein the circuit supporting portion further comprises an auxiliary folding portion.

10. The motor as claimed in claim 1, wherein the base includes a receiving portion in a form of a groove, wherein the groove extends from a first surface towards but spaced from a second surface of the base, wherein the groove extends radially inwards from a peripheral surface extending between the first surface and the second surface of the base, wherein the circuit supporting portion is received in the groove, and wherein the distal end of the circuit supporting portion abuts an end wall of the groove.

11. The motor as claimed in claim 1, wherein the circuit supporting portion has a maximum extent in the radial direction less than the extent between the center and the outer periphery of the at least one coil supporting portion in the radial direction.

12. A motor comprising: a base comprising a pivoting portion; a winding assembly comprising a support, wherein the support comprises at least one coil supporting portion and a circuit supporting portion connected to the at least one coil supporting portion, wherein a coil is arranged on each of the at least one coil supporting portion, wherein a circuit is arranged on the circuit supporting portion and electrically connected to the coil or coils, wherein a folding portion is arranged between the at least one coil supporting portion and the circuit supporting portion, wherein the circuit supporting portion and the at least one coil supporting portion are folded and stacked together via the folding portion, and wherein the circuit supporting portion has a distal end located between a center and an outer periphery of the at least one coil supporting portion in a radial direction; and a rotor rotatable coupled to the pivoting portion of the base, wherein the pivoting portion of the base includes a shaft tube, wherein the shaft tube includes an outer periphery having a flange, wherein the flange has an end face spaced from a surface of the base in an axial direction of the base, wherein the circuit supporting portion includes a first face flush with the end face of the flange, and wherein the circuit supporting portion further includes a second face abutting the surface of the base.

\* \* \* \* \*